(12) United States Patent
Gash (10) Patent No.: US 11,009,178 B2
(45) Date of Patent: May 18, 2021

(54) PUMP PACKAGE FRAME

(71) Applicant: WESTERN GLOBAL HOLDINGS LIMITED, Bristol (GB)

(72) Inventor: Malcolm Gash, Dubai (AE)

(73) Assignee: WESTERN GLOBAL HOLDINGS LIMITED

( * ) Notice: Subject to any disclaimer, the term of this patent is extended or adjusted under 35 U.S.C. 154(b) by 82 days.

(21) Appl. No.: 16/413,853

(22) Filed: May 16, 2019

(65) Prior Publication Data
US 2019/0360631 A1     Nov. 28, 2019

(30) Foreign Application Priority Data
May 24, 2018   (GB) .................................... 1808562

(51) Int. Cl.
| | |
|---|---|
| *F16M 1/026* | (2006.01) |
| *F16M 5/00* | (2006.01) |
| *F01D 25/28* | (2006.01) |
| *F04D 29/60* | (2006.01) |
| *F04D 13/16* | (2006.01) |
| *F04B 53/22* | (2006.01) |
| *B65D 19/44* | (2006.01) |

(52) U.S. Cl.
CPC ............ *F16M 1/026* (2013.01); *B65D 19/44* (2013.01); *F01D 25/28* (2013.01); *F04B 53/22* (2013.01); *F04D 13/16* (2013.01); *F04D 29/605* (2013.01); *F05B 2240/916* (2013.01)

(58) Field of Classification Search
CPC .... F16M 1/00; F16M 1/026; F05B 2240/916; F04D 29/605; F04D 13/16; F04B 53/22; F04B 53/16; B65D 19/44; B65D 85/68; F01D 25/28
See application file for complete search history.

(56) References Cited

U.S. PATENT DOCUMENTS

| | | | |
|---|---|---|---|
| 4,827,147 A  * | 5/1989 | Mizushima | ............. F02B 63/04 |
| | | | 290/1 A |
| 5,217,238 A | 6/1993 | Cyphers et al. | |
| | | (Continued) | |

FOREIGN PATENT DOCUMENTS

WO         2016181029 A1    11/2016

OTHER PUBLICATIONS

Search Report for App. No. GB18085621; dated Nov. 12, 2018; 3 pgs.

*Primary Examiner* — Tan Le
(74) *Attorney, Agent, or Firm* — Gardner Groff & Greenwald, PC (57) ABSTRACT

This application concerns a frame for a pump package for connecting to a liquid storage tank, the frame comprising a mounting frame portion and a transport frame portion. The mounting frame portion has an installation side for securing the mounting frame portion to the outside of a liquid storage tank and a mounting side for securing a pump package to the mounting frame portion. The transport frame portion has one or more lifting points for lifting the pump package when secured to the mounting frame portion. Together, the mounting frame portion and the transport frame portion form an enclosed space for containing the pump package when the mounting frame portion and the transport frame portion are attached.

17 Claims, 5 Drawing Sheets

(56) References Cited

U.S. PATENT DOCUMENTS

| | | | | |
|---|---|---|---|---|
| 5,318,314 | A | * | 6/1994 | Cyphers .................... B62B 1/02 |
| | | | | 141/231 |
| 5,965,949 | A | * | 10/1999 | Fukuda ................... F02B 63/04 |
| | | | | 290/1 A |
| 6,000,903 | A | * | 12/1999 | Hatch .................... B65D 85/68 |
| | | | | 206/319 |
| D703,137 | S | * | 4/2014 | van Deursen ................ D13/116 |
| 9,457,822 | B2 | * | 10/2016 | Rumao ................. F02B 63/044 |

* cited by examiner

PUMP PACKAGE FRAME

The present application concerns a frame for a pump package, particularly a frame on which a pump package can be assembled and connected to a liquid storage tank.

BACKGROUND OF THE INVENTION

It is known to provide containerised tanks to safely store liquid such as fuel or other potentially hazardous fluids. For example, large construction sites can consume a significant amount of fuel and having a fuel storage tank on site can remove the time wasted waiting for fuel deliveries.

Such tanks often require the ability to quickly and efficiently connect to and supply fuel to various pieces of auxiliary machinery such as generators, heaters, lighting towers etc. To facilitate this, known tank systems feature an integral equipment cabinet which houses pumps and accessories for connection to the intended machinery. The pumps and accessories that are used to connect and supply stored liquid from a tank to one or more auxiliary machinery shall be referred to herein as a "pump package", although any suitable term may be used in the art.

Pump packages may be considered as "bespoke" items in that the exact configuration of a pump package (in terms of the pumps and accessories included therein) is dependent on the auxiliary machinery with which the pump package and tank is to be used, and this may vary for different projects. For example, there may be upward of 200 different possible combinations of pumps and accessories that could be used for a pump package.

Usually the individual pumps and accessories of a pump package are designed, manufactured and assembled directly into an equipment cabinet that is integral to the liquid storage tank because the complete, assembled pump package will be too heavy and difficult to place into position in the cabinet. However, a problem with assembling the pump package directly into a cabinet is that assembly can begin only after the liquid storage tank has been manufactured and delivered to the same location, e.g. at an assembly depot.

Accordingly, it is desired to provide a means for assembling the pump package at a location that is remote from the cabinet of a liquid storage tank and for easily transporting the assembled pump package to a position in the cabinet.

SUMMARY OF THE INVENTION

In accordance with a first aspect, there is provided a frame for a pump package for connecting to a liquid storage tank, the frame comprising a mounting frame portion and a transport frame portion; wherein the mounting frame portion has an installation side and a mounting side opposite the installation side and has one or more fixings for securing the mounting frame portion to the outside of a liquid storage tank with the installation side against the liquid storage tank and one or more fixings for securing a pump package to the mounting frame against the mounting side; wherein the transport frame portion has one or more lifting points for lifting the pump package when secured to the mounting frame; and wherein the transport frame portion is detachable from the mounting frame portion such that it can be removed once the mounting frame portion and pump package are secured to the liquid storage tank.

The mounting frame portion and the transport frame portion may together form an enclosed space for containing the pump package when the mounting frame portion and the transport frame portion are attached.

The transport frame portion may be connectable to one of a plurality of the mounting frame portions interchangeably.

The mounting frame portion may further comprise a shelf on the mounting side for supporting the pump package.

The mounting frame portion may be arranged to remain installed on the tank and attached to the pump package while the pump package pumps liquid.

The transport frame portion may be arranged to be lifted together with the mounting frame portion and the pump package.

The mounting frame portion may be arranged such that the entire weight of the mounting frame portion and the pump package are supported by the tank when the mounting frame portion and pump package are attached to the tank.

The tank may be an intermodal bulk container. The tank may be a bulk container of fuel. The tank may be a bulk container that is configured to remain stationary, e.g. when the fluid contained therein is pumped therefrom. The tank may be an intermediate bulk container, e.g. a pallet mounted, industrial grade reusable container that is used for storing and transporting bulk liquids.

The frame may form a cuboidal shape when the mounting frame portion and the transport frame portion are attached.

The lifting points may be lifting fork pockets for receiving lifting forks of a fork lift.

The pump package may fit inside the frame.

In accordance with another aspect, there is provided a method of installing a pump package on a liquid storage tank, comprising: constructing a pump package on a mounting frame portion; attaching a transport frame portion to the mounting frame portion to form a frame assembly; lifting the frame assembly with the pump package by applying a lifting force to the transport frame portion; connecting the frame assembly to a liquid storage tank; and detaching the transport frame portion from the mounting frame portion while leaving the pump package connected to the liquid storage tank via the mounting frame portion.

The method may further comprise attaching the transport frame portion to a second mounting frame portion.

The method may further comprise pumping liquid with the pump package while the pump package and mounting frame portion are installed on the tank.

The pump package may be constructed on the mounting frame at a location remote from the tank.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE FIGURES

Embodiments will now be described by way of example only, with reference to the drawings, in which.

DETAILED DESCRIPTION

Referring to FIGS. 1 to 5, there is generally shown a frame assembly 100 comprising a mounting frame portion 1 and a transport frame portion 2 removably attached to one another and suitable for receiving and containing a pump package 3 therein.

Figure 1:
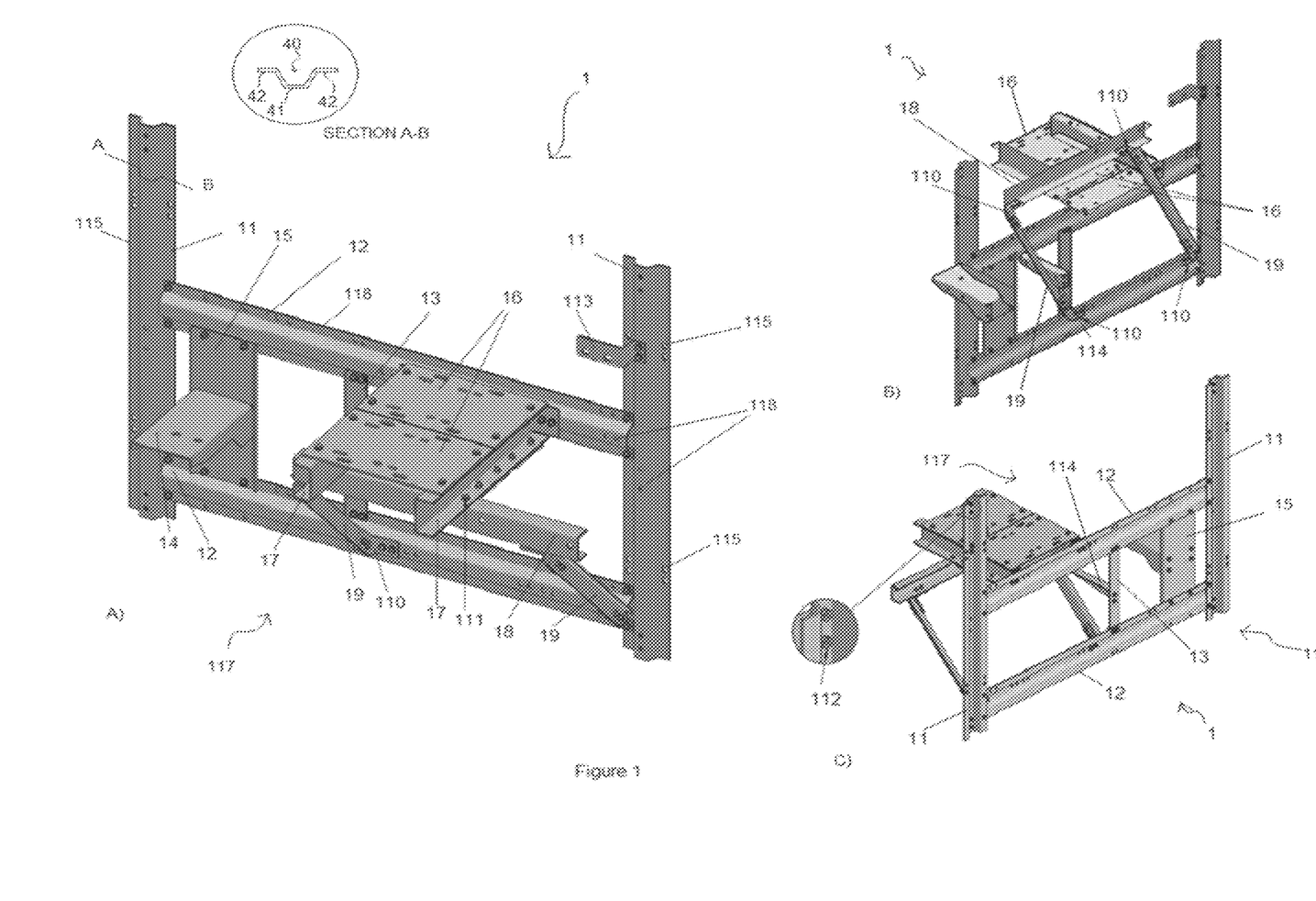
FIG. 1 shows three perspective views of a mounting frame portion of the frame assembly of the technology described herein.

FIG. 1 schematically shows three perspective views of a mounting frame portion 1 of the frame assembly 100 of the technology described herein. In particular, FIGS. 1a and 1b show two different front views of the mounting frame portion 1, whereas FIG. 1c shows a back view of the mounting frame portion 1.

The mounting frame portion 1 serves as a base on which a pump package may be securely assembled and mounted, and which itself may be mounted to a, e.g. cabinet of a, liquid storage tank (e.g. an intermodal bulk container).

As best shown in FIG. 1a, the mounting frame portion 1 comprises two vertical frame members 11 arranged substantially parallel to each other. The vertical frame members 11 are offset from each other in the horizontal direction and are connected by two substantially parallel, horizontal frame members 12 extending therebetween. The horizontal frame members 12 are spaced apart in the vertical direction and are connected to the vertical frame members 11 by fixings such as hex bolts and nuts. In the example shown, one of the horizontal frame members 12 is connected towards a lower end of the vertical frame members 11 and the other horizontal frame member 12 is connected approximately midway between the upper and lower ends of the vertical frame members 11.

Each one of the vertical frame members 11 and the horizontal frame members 12 is formed from a sheet metal that has been folded and shaped to define a substantially hat-shaped channel 40 in cross section (taken along its transverse direction as shown by cross-section A to B of FIG. 1a). The channel 40 comprises a pair of flanges 42 located either side of a central crown 41 and connected to the crown 41 by angled webs such that the flanges 42 are parallel to the crown 41 but offset therefrom. The vertical frame members 11 and the horizontal frame members 12 are correspondingly shaped in that they have the same (or substantially the same) shape and dimension in cross section.

The horizontal frame portions 12 are attached to the vertical frame portions 11 via their respective flanges 42 such that the crown 41 of each hat-shaped channel extends from the flanges 42 in a direction that faces a mounting side 117 at the front of the mounting frame portion 1. In the arrangement of FIG. 1, the horizontal frame portions 12 and the vertical frame portions 11 are connected via inner flanges 42 of the vertical frame portions 12 and upper and lower flanges 42 of the horizontal frame portions 12 by means of through-holes and suitable fixings such as hex bolts and nuts, although any suitable fixings may be used.

The vertical frame members 11 include a plurality of through-holes 115 on the flanges 42 for receiving fixings to secure the mounting frame portion 1 to the cabinet of a liquid storage tank (as will described further below) so that an installation side 116 of the mounting frame portion 1 (which is opposite to the mounting side 117) lies against the liquid storage tank.

The mounting frame portion 1 comprises a plurality of through-holes 118 formed in the vertical and horizontal frame members 11, 12 for securing a number of fixtures which are used to support a pump package on the mounting frame portion 1. The through-holes 118 are provided on both the flanges 42 and crown 41 of the channel 40.

In the example shown in FIG. 1, there are three shelves (or "platforms") secured to the horizontal frame members 12.

There is a first platform 14 and a second platform 114, each suitable for supporting a pipe of the pump package, attached to the mounting frame portion 1 via a first batten 15 and a second batten 13, respectively. The battens 13, 15 extend vertically between, and are connected to, the inner flanges 42 of the two horizontal support members 12. The first and second platforms 14, 114 each comprise a horizontal surface for supporting a pipe.

The third platform 16 is connected to the mounting frame portion 1 for supporting a motor of the pump package. The third platform 16 includes two horizontal plates secured (by fixtures 111) on top of two supporting beams 17 (i.e. first and second supporting beams) that are in turn connected perpendicularly to the crown 41 of the uppermost horizontal frame member 12. Additional support for the platform 16 is provided by a third supporting beam 18 which runs underneath and between (i.e. perpendicular to) the first and second supporting beams 17. The third supporting beam 18 extends parallel to the horizontal frame portions 12 and is connected to the crown 41 of the lowermost horizontal frame member 12 via angled support arms 19. Each angled support arm 19 has two brackets, one bracket at each of its two respective distal ends, for connecting the third supporting beam 18 to the lowermost horizontal frame members 12.

In addition to the platforms, the mounting frame portion 1 includes a pipe bracket 113 attached to a crown 41 portion of one of the vertical frame members 11 for securing a pipe of the pump package to the mounting frame portion 1. There may be any desired number of such brackets attached to the mounting frame portion 1, as appropriate.

Although a specific configuration of fixtures is shown in FIG. 1, it will be appreciated that the user or designer of the frame assembly may modify and customise the number, type and placement of fixings (shelves, brackets, etc.) on the mounting frame portion 1 without departing from the scope of the technology described herein.

Figure 2:
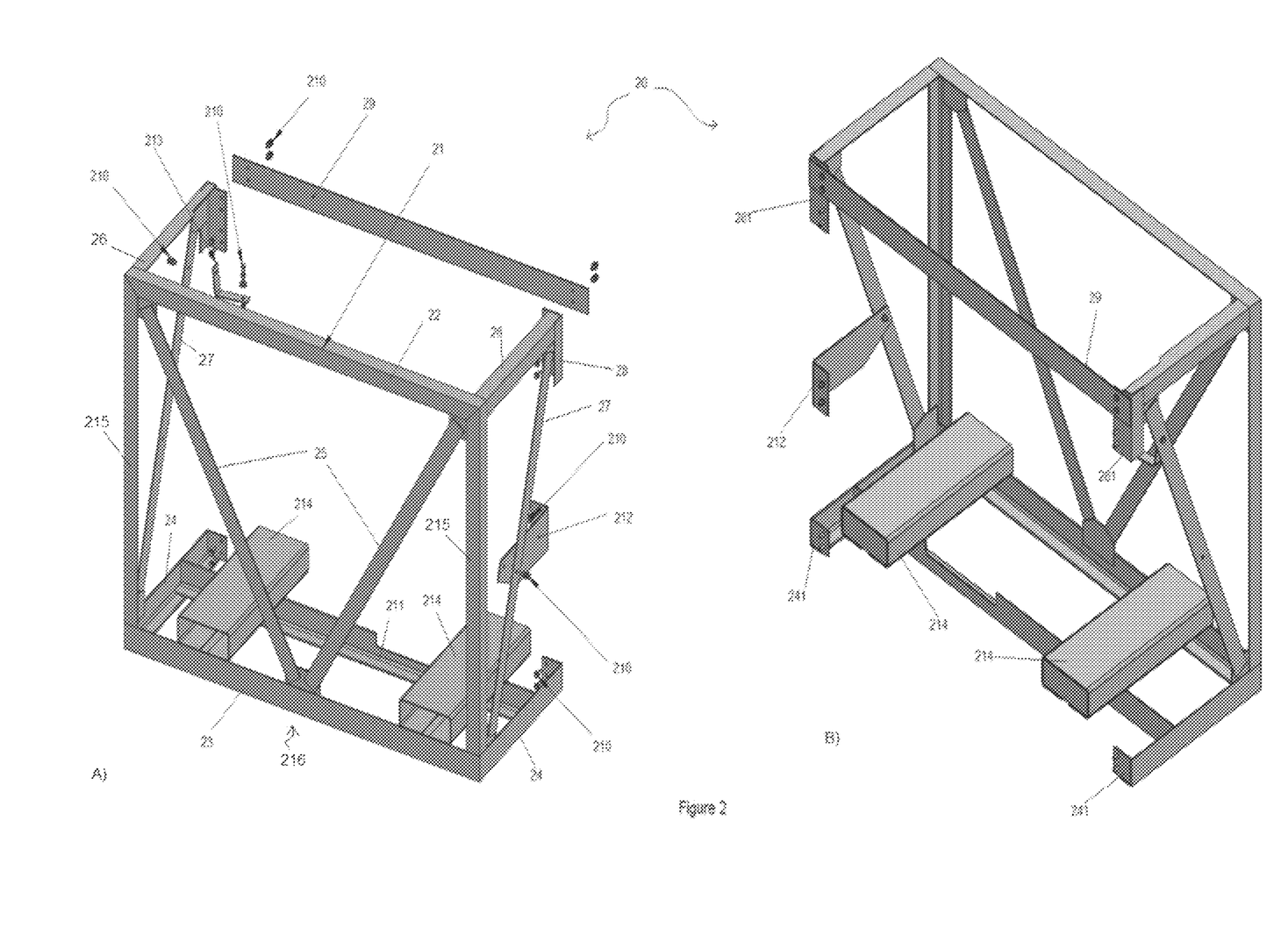
FIG. 2 shows two perspective views of a transport frame portion of the frame assembly, which is to be used for transporting the mounting frame portion of FIG. 1.

FIG. 2 shows two perspective views of a transport frame portion 2 to be used for transporting the mounting frame portion 1 of FIG. 1. In particular, FIG. 2a shows a front view of the transport frame portion 2 and FIG. 2b shows a rear view of the transport frame portion 2.

The transport frame portion 2 comprises a U-frame member 21 which comprises a horizontal arm 22 and two vertical arms 215 extending parallel down towards a base frame member 216. The U-frame member 21 is formed of a single piece of folded sheet metal.

The base frame member 216 comprises a horizontal front base element 23 and two horizontal side base elements 24 extending perpendicularly away from the front base element 23 in the same direction. The base frame member 216 is formed of a bent piece of sheet metal. The distal end of each side base element 24 (opposite the front base element 23) is bent to define a back surface 241 which is parallel to the longitudinal direction of the front base element 23 and is configured (with through-holes and hex bolts 210) to attach to a mounting side 117 of the crown 41 of a corresponding vertical frame member 11 of the mounting frame portion 1.

The vertical arms 215 of the U-frame member 21 are attached (e.g. welded) to the base frame member 216 at the corners between the front base element 23 and the side base elements 24. Additional support and rigidity is provided to the structure by use of front (triangulation) braces 25 each extending diagonally from the centre of the front base element 23 to a corner between the horizontal arm 22 and a respective vertical arm 215 of the U-frame 21.

Connected to each corner of the U-frame member 21, between the horizontal arm 22 and an adjacent vertical arm 215, is a side arm 26 extending perpendicularly away therefrom in a direction that is parallel to the side base elements 24 of the base frame member 216. The distal end of each side arm 26 (opposite the U-frame member 21) is fitted with a connecting bracket 28. The connecting bracket 28 includes a back surface 281 which is parallel to the longitudinal direction of the horizontal arm 22 of the U-frame member 21 and is configured (with through-holes and hex bolts) to attach to a mounting side 117 of the crown 41 of a corresponding vertical frame member 11 of the mounting frame portion 1. A back plate 29 is connected between the two connecting brackets 28 on their back surfaces 281 to provide additional rigidity.

Each side arm 26 is supported by a side brace 27 which extends diagonally from a corner between a respective side base element 24 and the front base element 23 to the connecting bracket 28 which is provided at the distal end of the side arm 26.

As can be seen in FIG. 2, a side protection plate 212 is connected to at least one of the side braces 27 for attachment to a mounting side 117 of the crown 41 of a corresponding vertical frame member 11 of the mounting frame portion 1. At least one of the side braces 27 also includes a flange bracket 213 for supporting one or more components of the pump package 3 in transit.

It will be appreciated that the transport frame portion 2 generally defines a cuboidal structure having an open side for receiving the mounting frame portion 1 and pump package 3.

In order to transport the mounting frame portion 1 and pump package 3, the transport frame portion is provided with lifting fork pockets 214 having open ends at the front of the transport frame portion 2 which are suitable for receiving lifting forks of a fork lift for lifting the transport frame portion 2. The lifting fork pockets 214 are attached to the transport frame portion 2 and are supported by the front base element 23 and a beam 211 connected between the side base elements 24 of the base frame member 216. The lifting fork pockets 214 allow the transport frame portion 2, the mounting frame portion 1 and pump package 3 to be transported as a pallet, e.g. to another assembly plant for tank and pump installation, as will be described further below.

It will be appreciated that FIG. 2 shows only an example of the transport frame portion 2 of the technology described herein. Various modifications to the transport frame portion 2 shown may be made without departing from the scope of the technology described herein.

Figure 3:
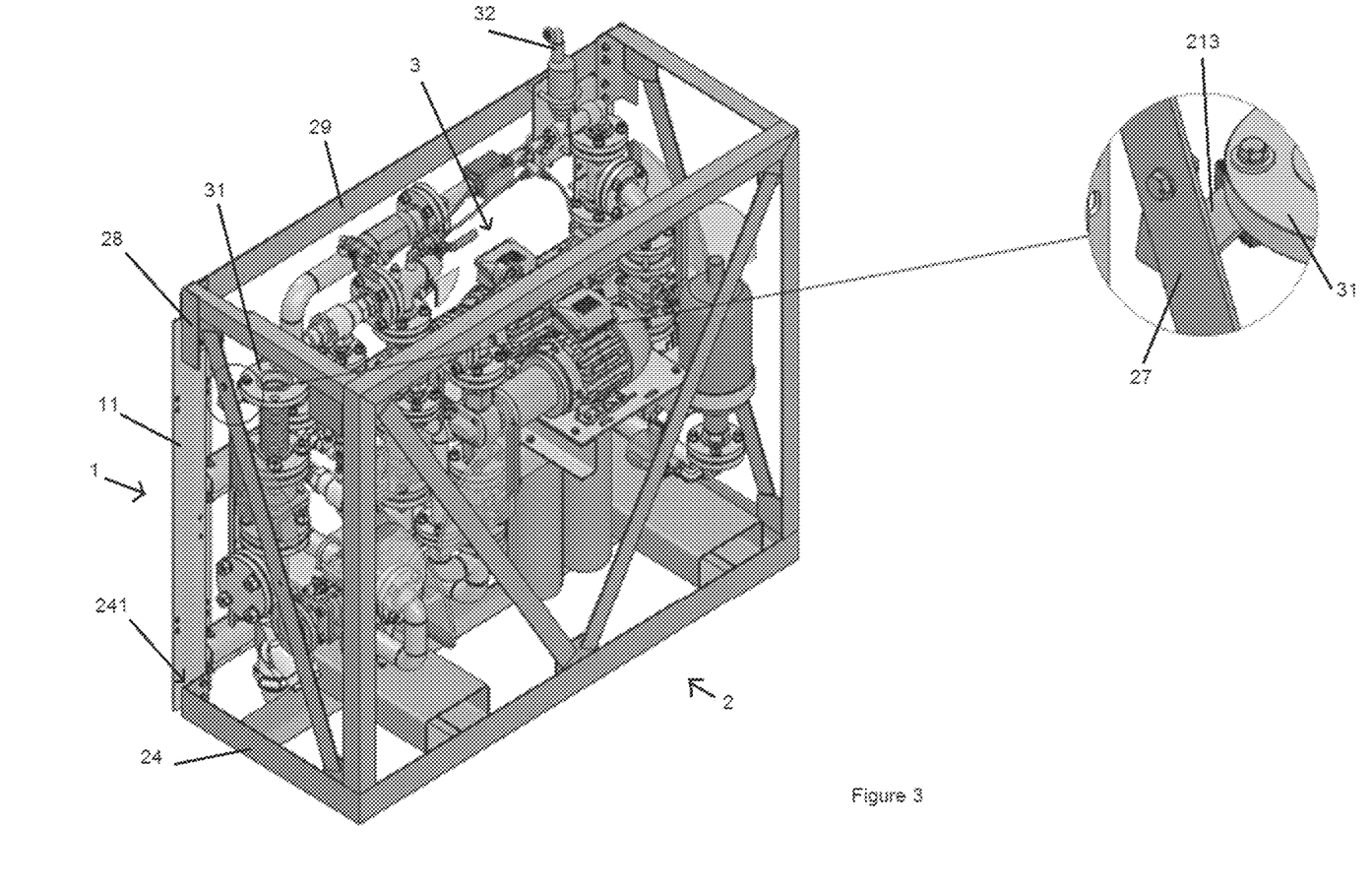
FIG. 3 shows a front view of the frame assembly in combination with a pump package.
Figure 4:
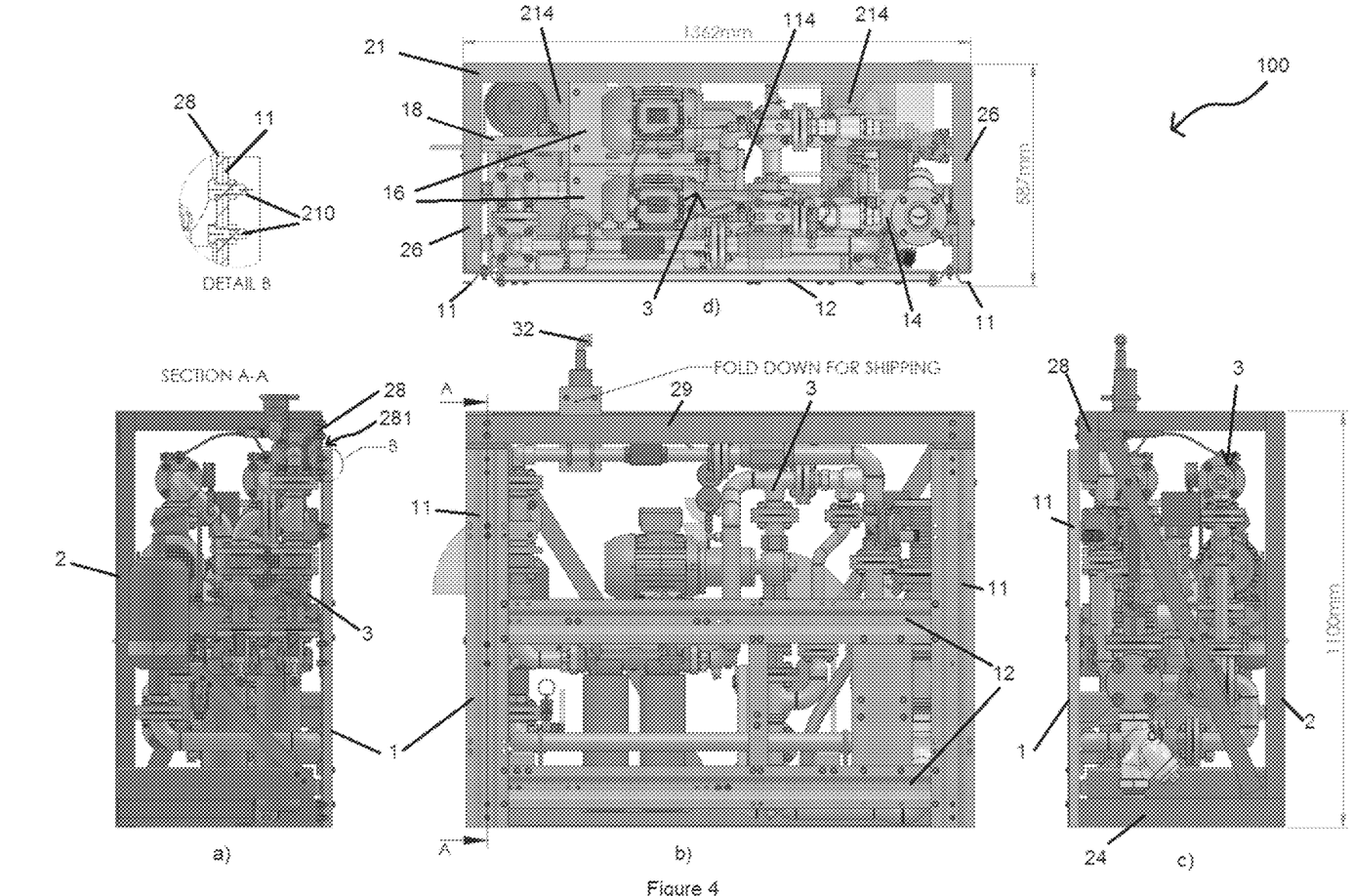
FIG. 4 shows four separate views of the frame assembly and pump package of FIG. 3.

The frame assembly 100 of the technology described herein will now be described with respect to FIGS. 3 and 4, which schematically show the mounting frame portion 1, the transport frame portion 2 and the pump package 3 in combination. FIG. 3 schematically shows a front view of the frame assembly 100. FIG. 4a shows a cross section taken along the line A-A of the frame assembly 100 shown in FIG. 4b; FIG. 4b shows a back view of the frame assembly 100, particularly an installation side of the mounting frame portion 1; FIG. 4c shows a side view of the frame assembly 100; and FIG. 4d shows a top view of the frame assembly 100.

After a pump package 3 has been assembled on to the mounting frame portion 1, the mounting frame portion 1 is attached to the transport frame portion 2 as shown in FIGS. 3 and 4. In particular, the back surface 241 of each side base element 24 of the transport frame portion 2 is attached to the mounting side of the crown 41 of the hat-shaped channel 40 at the bottom end of a corresponding vertical frame member 11 of the mounting frame portion 1. Additionally, the back surface 281 of the connecting bracket 28, at the distal end of each side arm 26, of the transport frame portion 2 is attached to the top end of the base 41 of the U-shaped channel 40 of a corresponding vertical frame member 11 of the mounting frame portion 1.

As best shown in "DETAIL B" of FIG. 4a, the connecting brackets 28 are connected to the vertical frame members 11 by hex bolts and nuts 210, although any suitable fixings may be used instead. The side base elements 24 are also connected to the vertical frame members 11 in this manner.

To provide additional stability in transit, various components of the pump package 3 can be (and are, in the illustrated example) attached to the transport frame portion 2. As best shown in FIG. 3, an annular flange 31 of the pump package 3 is connected to the flange bracket 213 of a side brace 27 of the transport frame portion 2. This connection is removed after (or immediately before) installing the mounting frame portion 1 having the pump package 3 on a tank.

It can be seen in FIGS. 3 and 4 that when the mounting frame portion 1 and the transport frame portion 2 are connected, the mounting frame portion 1, particularly its vertical and horizontal frame members 11, 12, effectively close the open side of the transport frame portion 2 such that the mounting frame portion 1 and the transport frame portion 2 together define an enclosed (in this case, cuboidal) space which contains substantially all of the pump package 3 attached to the mounting frame portion 1. One or more components of the pump package, such as an inlet or outlet pipe 32 shown in FIGS. 3 and 4, may be movable between a first position in which they are enclosed by the frame assembly, and a second, in-use position that would otherwise protrude from the frame assembly 100.

In the example of FIGS. 1 to 4, the frame assembly has a generally cuboidal shape which corresponds to the shape of a cabinet of the tank on which the mounting frame portion 1 and the pump package 3 is to be installed.

It will be appreciated that the frame assembly may have any suitable or desired shape and dimensions, and this will depend on the shape and size of the cabinet on which the mounting frame portion 1 and the pump package 3 to be installed.

While the frame assembly has been described above with respect to its structural features, it will be appreciated that the technology described herein extends to a method of using the frame assembly. This will now be described with reference to FIG. 5.

Figure 5:
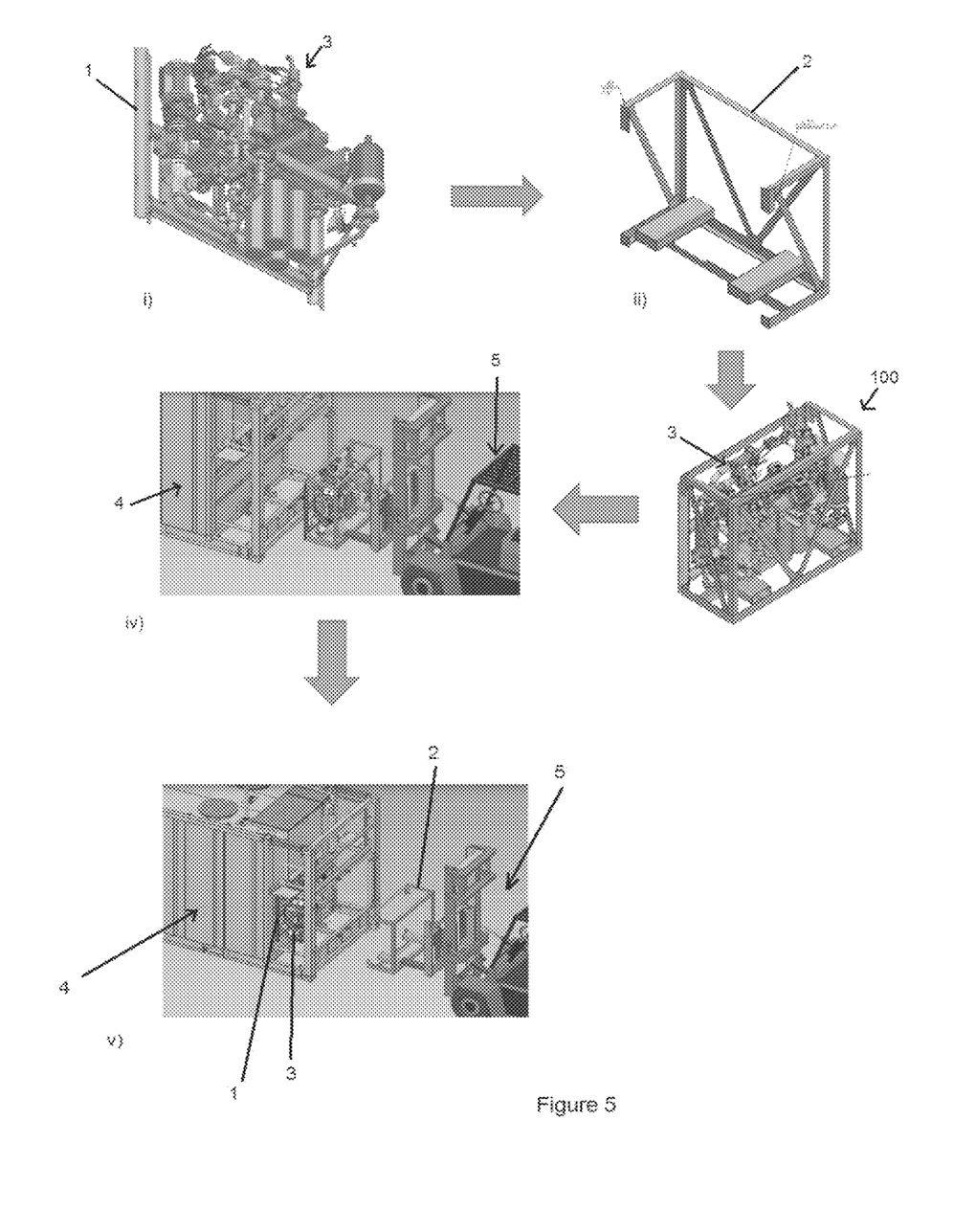
FIG. 5 illustrates a method of using the frame assembly of FIGS. 1 to 4.

FIG. 5 schematically illustrates a method of using a frame assembly having features corresponding to those described with respect to FIGS. 1 to 4.

The method begins at step i), at which point a pump package 3 is constructed (assembled) on the mounting frame portion 1. This step may be performed at a location remote from a liquid storage tank 4 and, e.g., at a time when the liquid storage tank is being prepared or delivered to the location of the pump package 3.

A transport frame portion 2 is provided at step ii) and is attached to the mounting frame portion 1 at step iii), such that the transport frame portion 2 is ready to be used to transport the assembled pump package 3 and mounting frame portion 1 to the liquid storage tank 4.

After the liquid storage tank 4 has been manufactured and delivered to the same location as the frame assembly 100 and pump package 3, the method proceeds to step iv) at which point a fork lift 5 is used to lift the frame assembly 100 with the pump package 3 by applying a lifting force to the transport frame portion 2 via the lifting fork pockets. The mounting frame portion 1 having the pump package 3 is then connected to and installed on the liquid storage tank 4 (e.g. in a cabinet of the liquid storage tank 4). Various other components of the pump package 3, such as inlet pipes, may also be connected to the liquid storage tank 4 at this stage.

After the mounting frame portion 1 and the pump package 3 is connected to and installed on the liquid storage tank 4 at step iv), the method proceeds to step v), at which point the transport frame portion 2 of the frame assembly 100 is detached from the mounting frame portion 1 and carried away from the liquid storage tank 4 by the fork lift 5. The pump package 3 will proceed to pump liquid from the liquid storage tank 4 while the pump package 3 and mounting frame portion 1 remain installed on the liquid storage tank 4. The transport frame portion 2, however, may then be used with, i.e. attached to, another mounting frame portion (not shown) for transporting the mounting frame portion (and associated pump package) to a different liquid storage tank (or the same liquid storage tank, if desired).

When the mounting frame portion and pump package is in the installed position on the liquid storage tank 4, the entire weight of the mounting frame portion 1 and the pump package 3 is supported by the liquid storage tank 4.

As described, the mounting frame portion 1 allows the pump package 3 to be assembled without a liquid storage tank 4 being present, and the transport frame portion 2 allows the assembled pump package 3 and mounting frame portion 1 to be transported, e.g. to another assembly plant, for fitting the pump package 3 to the tank 4.

By providing a mounting frame portion having one or more fixings for securing and supporting a pump package, the assembly of the pump package can begin (and, in most cases, be completed) without the tank being present. In this way, the total time taken to assemble and install a pump package to a tank (i.e. the time between placing an order by the consumer and final assembly) may be reduced. This is advantageous in that it minimises delays to the consumer.

By providing a transport frame portion which is detachable from the mounting frame portion, the assembled pump package can be easily transported to a position in the cabinet of a liquid storage tank, while maximising the amount of free space in the cabinet (e.g. for the pump package and associated elements) when the mounting frame portion is connected to the liquid storage tank and the transport frame portion is detached. This is especially true when compared to hypothetical arrangements where a mounting frame portion itself is provided with one or more lifting points and associated support structures for transporting an assembled pump package to a position in the cabinet.

Although the transport frame portion 2 has been described as having lifting fork pockets 214, it will be appreciated that other forms of lifting points (i.e. formations), such as lifting eyes, could be used to lift and move the transport frame portion 2 into place.

While the invention has been illustrated and described in detail in the drawings and foregoing description, such illustration and description are to be considered illustrative or exemplary and not restrictive; the invention is not limited to the disclosed embodiments.

The invention claimed is:

1. A frame for a pump package for connecting to a liquid storage tank, the frame comprising a mounting frame portion and a transport frame portion;
   wherein the mounting frame portion has an installation side and a mounting side opposite the installation side and has one or more fixings for securing the mounting frame portion to a liquid storage tank with the installation side against the liquid storage tank and one or more fixings for securing a pump package to the mounting frame portion against the mounting side;
   wherein the transport frame portion comprises means for fixedly securing the transport frame portion to the mounting frame portion so as to prevent relative movement of the mounting frame portion and the transport frame portion;
   wherein the transport frame portion has one or more lifting points for lifting the pump package when fixedly secured to the mounting frame portion;
   wherein the transport frame portion is detachable from the mounting frame portion such that it can be removed once the mounting frame portion and pump package are secured to the liquid storage tank; and
   wherein the mounting frame portion and the transport frame portion together form an enclosed space for containing the pump package when the mounting frame portion is fixedly secured to the transport frame portion.

2. The frame of claim 1, wherein the transport frame portion is connectable to one of a plurality of the mounting frame portions interchangeably.

3. The frame of claim 1, wherein the mounting frame portion further comprises a shelf on the mounting side for supporting the pump package.

4. The frame of claim 1, wherein the mounting frame portion is arranged to remain installed on the tank and attached to the pump package while the pump package pumps liquid.

5. The frame of claim 1, wherein the transport frame portion is arranged to be lifted together with the mounting frame portion and the pump package.

6. The frame of claim 1, wherein the mounting frame portion is arranged such that the entire weight of the mounting frame portion and the pump package are supported by the tank when the mounting frame portion and pump package are attached to the tank.

7. The frame of claim 1, wherein the tank is an intermodal bulk container.

8. The frame of claim 1, wherein the frame forms a cuboidal shape when the mounting frame portion and the transport frame portion are attached.

9. The frame of claim 1, wherein the lifting points are lifting fork pockets for receiving lifting forks of a fork lift.

10. The frame of claim 1 in combination with the pump package secured to the mounting frame portion.

11. The frame and pump package combination of claim 10, wherein the pump package fits inside the frame.

12. A method of installing a pump package on a liquid storage tank, comprising:
    providing the frame of claim 1;
    constructing, using the one or more fixings, a pump package on the mounting frame portion against the mounting side of the mounting frame portion;
    fixedly securing, using said means, the transport frame portion to the mounting frame portion so as to prevent relative movement of the mounting frame portion and the transport frame portion and to form a frame assembly defining an enclosed space containing the pump package;

lifting the frame assembly with the pump package by applying a lifting force to the one or more lifting points of the transport frame portion;

connecting, using the one or more fixings, the mounting frame portion of the frame assembly to a liquid storage tank with the installation side of the mounting frame portion against the liquid storage tank; and detaching the transport frame portion from the mounting frame portion while leaving the pump package connected to the liquid storage tank via the mounting frame portion.

13. The method of claim 12, further comprising attaching the transport frame portion to a second mounting frame portion.

14. The method of claim 12, further comprising pumping liquid with the pump package while the pump package and mounting frame portion are installed on the tank.

15. The method of claim 12, wherein the pump package is constructed on the mounting frame portion at a location remote from the tank.

16. The frame of claim 1, wherein said means comprises one or more connecting brackets to attach to the mounting frame portion.

17. The frame of claim 16, wherein the transport frame portion comprises a frame member and two side arms extending substantially perpendicularly from the frame member, wherein each of said side arms comprises a distal end having a respective connecting bracket.

* * * * *